United States Patent [19]

Bell

[11] 4,408,213
[45] Oct. 4, 1983

[54] REINFORCED BUBBLE RECORDING MEDIUM AND INFORMATION RECORD

[75] Inventor: Alan E. Bell, Hampton, N.J.
[73] Assignee: RCA Corporation, New York, N.Y.
[21] Appl. No.: 316,916
[22] Filed: Oct. 30, 1981
[51] Int. Cl.³ ............................................ G01D 15/34
[52] U.S. Cl. ................................ 346/135.1; 365/127; 369/284; 430/945
[58] Field of Search .................... 346/76 L, 135.1; 369/275, 284, 288; 365/127, 126; 430/945

[56] References Cited

U.S. PATENT DOCUMENTS

| | | | |
|---|---|---|---|
| 3,560,994 | 2/1971 | Wolff et al. | 346/135 |
| 4,000,492 | 12/1976 | Willens | 346/1 |
| 4,097,895 | 6/1978 | Spong | 358/128 |
| 4,216,501 | 8/1980 | Bell | 358/128.5 |
| 4,285,056 | 8/1981 | Bell | 369/100 |
| 4,300,227 | 11/1981 | Bell | 369/84 |
| 4,360,895 | 11/1982 | Cornet | 365/127 |

OTHER PUBLICATIONS

Conference on Lasers and Electro-Optics, Jun. 10–12, 1981 IEEE/OSA Washington, D.C., p. 122.

Primary Examiner—Joseph W. Hartary
Attorney, Agent, or Firm—Birgit E. Morris; William J. Burke

[57] ABSTRACT

The invention is an improved optical recording medium and information record where information is recorded in the form of one or more bubbles in a light absorptive layer and a reinforcement layer which preferentially adheres to a light absorptive layer during the formation of the bubble. The reinforcement layer provides a path for heat to diffuse away from the bubble, thereby desensitizing the recording process and increasing the range of incident light powers over which a bubble is formed.

13 Claims, 4 Drawing Figures

REINFORCED BUBBLE RECORDING MEDIUM AND INFORMATION RECORD

The invention relates to an optical recording medium and information record and, in particular, to an optical information record in which information is recorded in the form of one or more bubbles in the light absorptive layer.

BACKGROUND OF THE INVENTION

Bell, in U.S. Pat. No. 4,285,056, incorporated herein by reference, has disclosed an optical recording medium comprising a light reflective layer, a spacer layer and a light absorptive layer where the material of the spacer layer melts, sublimes or decomposes at a temperature at least 300° C. or less than that of the material which comprises the light absorptive layer. Bell, in U.S. Pat. No. 4,300,227, incorporated herein by reference, has disclosed an improved version of this optical recording medium wherein the light absorptive layer melts at a temperature greater than 1000° C. and the spacer layer is composed of an organic material. In each of these optical recording media information may be recorded as bubbles in the light absorptive layer. The bubbles produce an increase in the reflectivity of this recording medium on readout and have a high signal-to-noise ratio due to the absence of the irregular rim usually found about an opening in the light absorptive layer.

One problem with this approach to the recording of information is the limited range of powers of the recording beam over which the bubble can be formed without bursting. When the absorptive layer separates from the underlying spacer layer to form the bubble, the heat loss to the spacer layer and the substrate is reduced so that a small increase in recording power leads to a perforation or melt-through of the bubble in the light absorptive layer.

It would be desirable to have an optical recording medium in which information is recorded in the form of bubbles in the light absorptive layer, but for which the recording power range over which the bubbles are formed is increased.

SUMMARY OF THE INVENTION

The invention is an improved optical recording medium and information record wherein a reinforcement layer is interposed between a spacer layer which overlies a substrate and a light absorptive layer. The reinforcement layer is composed of a material which does not melt, sublime or decompose at a temperature less than the melting temperature of the light absorptive layer and which preferentially adheres to the light absorptive layer rather than to the spacer layer.

The invention also includes an information record wherein information is recorded in the optical recording medium of the invention in the form of one or more bubbles in the combined light absorptive layer and the reinforcement layer.

DETAILED DESCRIPTION OF THE INVENTION

Figure 1:
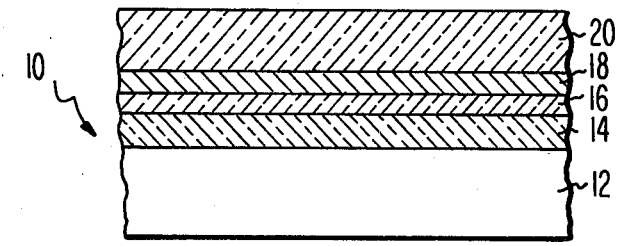
FIGS. 1 and 2 are cross-sectional views of two different embodiments of the optical recording medium of the invention.

Referring to FIG. 1, the optical recording medium 10 includes a substrate 12, a spacer layer 14 overlying a surface of the substrate 12, a reinforcement layer 16 overlying the spacer layer 14, a light absorptive layer 18 overlying the reinforcement layer 16 and an overcoat layer 20 overlying the light absorptive layer 18.

Figure 2:
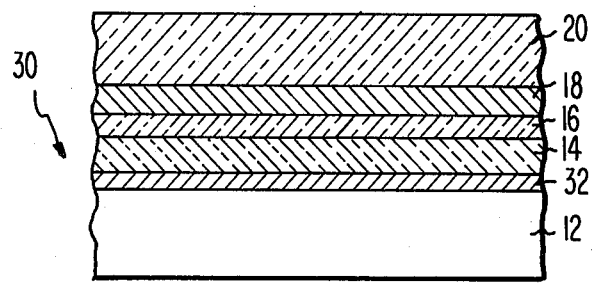
Figure 3:
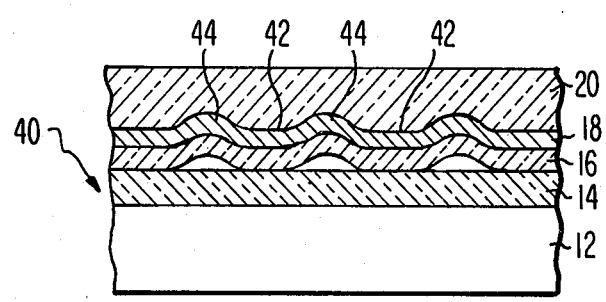
FIGS. 3 and 4 are cross-sectional views of two different embodiments of the information record of the invention.
Figure 4:
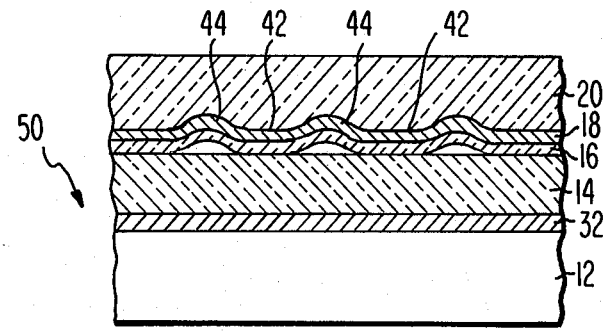

In FIGS. 2, 3 and 4 the identification of the common elements of the optical recording medium 30 and the information records 40 and 50 respectively, correspond to those of the optical recording medium 10 of FIG. 1.

In FIG. 2 the optical recording medium 30 also includes a light reflective layer 32 interposed between the substrate 12 and the spacer layer 14.

Referring to FIGS. 3 and 4 the information records 40 and 50 correspond to the optical recording media 10 and 30 respectively with information recorded therein. The information is recorded as one or more deformations of the surface 42 of the light absorptive layer 18 in the form of bubbles 44 in the surface 42. The bubbles are composed of portions of the light absorptive and reinforcement layers 16 and 18 respectively which together separate from the spacer layer and protrude above the surface 42. Typically, information is encoded by varying the length of the bubbles 44 and the unexposed areas between the bubbles along the direction of a track using a recording system such as that disclosed by Spong in U.S. Pat. No. 4,097,895, incorporated herein by reference.

The substrate 12 may be formed of glass, a plastic such as polyvinylchloride or a metal such as aluminum, typically in the form of a disc. Since any roughness of the surface of the substrate 12 on the scale of the diameter of a focused light beam will produce noise in the signal channel during readout, a non-conformal coating of a plastic material, such as an epoxy resin, which is deposited on the surface of the substrate 12 prior to the deposition of the overlying layers, will produce a microscopically smooth surface and eliminate this noise source.

The light reflective layer 32 reflects a substantial fraction of the light incident thereon at the recording wavelength and is typically formed of a metal such as aluminum or gold between about 30 and about 60 nanometers (nm) thick. Alternatively, a multi-layer dielectric reflector may be used.

The spacer layer 14 is substantially transparent at the wavelength of the recording and readout light beams and preferably melts, sublimes or decomposes at a temperature which is more than 300° C. less than the melting temperature of the light absorptive layer 18. Suitable materials for the spacer layer include magnesium fluoride, lead fluoride, polymerized hydrocarbons, fluorocarbons and chlorocarbons, thermoplastics and monomers such as sucrose benzoate and sucrose octoacetate. For a recording wavelength of about 820 nm a selenium-rich alloy may be used for the spacer layer 14.

The reinforcement layer 16 is substantially transparent at the recording wavelength and does not melt, sublime or decompose at temperatures below the melting temperature of the material of which the light absorptive layer 18 is composed. The reinforcement layer 16 comprises a material chosen to have good adhesion to the overlying light absorptive layer and relatively poor adhesion to the spacer layer 14 so that it will preferentially adhere to the light absorptive layer during and after formation of a bubble. Suitable materials for this layer may include silicon dioxide, titanium dioxide and aluminum oxide. The reinforcement layer 16 should be thin enough so that a significant fraction of the heat generated by optical absorption in the light absorptive layer 18 is transferred to the spacer layer 14; and so that the reinforcement layer 16 can locally deform in the same manner as the light absorptive layer 18. The reinforcement layer 16 should also be thick enough to provide a lateral heat leak from the bubble once it has separated from the spacer layer 14. A suitable thickness for the reinforcement layer 16 is between about 10 and about 40 nm.

The light absorptive layer 18 absorbs light at the recording wavelength and may be composed of a material such as titanium, platinum, rhodium, gold, nickel, chromium, manganese, vanadium or germanium or alloys thereof. These materials may be deposited using standard vacuum evaporation or electron beam evaporation techniques.

The overcoat layer 20 is used to reduce signal defects caused by surface dust which precipitates from the environment onto the optical recording medium and is typically between about 0.05 and about 1 millimeter thick. A useful material for this application is a silicone resin which may be deposited by casting or spinning techniques.

For the optical recording medium 10 and the information record 40 the thickness of the light absorptive layer 18 is chosen to provide a balance between maximum absorption and maximum reflectivity of light at the recording wavelength. Typically the thickness of the light absorptive layer is between about 10 and about 50 nm. In these embodiments the spacer layer preferably has a thickness sufficient to provide thermal isolation of the light absorptive layer from the substrate 12 if necessary and may be greater than 10 nm.

For the optical recording medium 30 and the information record 50, the thickness of the light absorptive layer 18 is preferably so related to the thicknesses of the reinforcement layer 16 and the spacer layer 14 and the optical constants of the light reflective layer 32, the spacer layer 14, the reinforcement layer 16 and the light absorptive layer 18 so as to reduce, and preferably to minimize, the optical reflectivity of the recording medium 30 and of the undeformed portions of the information record 50. Preferably, the thickness of the light absorptive layer is between 3 and about 30 nm and the thickness of the spacer layer is between about 10 nm and about 500 nm.

The utility of the invention lies in the fact that the reinforcement layer preferentially adheres to the light absorptive layer and separates from the spacer layer during the bubble formation. The adhesion of these two layers desensitizes the recording process once the bubble is formed because it provides a path for increased diffusion of heat away from the bubble. This in turn increases the range of the incident recording light beam powers over which bubbles can be formed and thus decreases the likelihood of the formation of an opening in the absorptive layer due to fluctuations in the peak incident recording light beam power. The reinforcement layer may also improve the mechanical stability of the bubbles, once formed.

I claim:

1. An optical recording medium comprising
    a substrate;
    a spacer layer overlying a surface of the substrate;
    a substantially transparent reinforcement layer overlying the spacer layer; and
    a light absorptive layer overlying the spacer layer;
    wherein the spacer layer melts, sublimes or decomposes at a temperature less than the melting temperature of the light absorptive layer and wherein the reinforcement layer does not melt, sublime or decompose at a temperature less than the melting temperature of the light absorptive layer and preferentially adheres to the light absorptive layer.

2. The article of claim 1 wherein a light reflective layer is interposed between the substrate and the spacer layer.

3. An information record comprising
    a substrate;
    a spacer layer overlying the surface of the substrate;
    a substantially transparent reinforcement layer overlying the spacer layer; and
    a light absorptive layer overlying the spacer layer;
    wherein the spacer layer melts, sublimes or decomposes at a temperature less than the melting temperature of the light absorptive layer wherein the reinforcement layer does not melt, sublime or decompose at a temperature less than the melting temperature of the light absorptive layer and preferentially adheres to the light absorptive layer and wherein information is recorded as one or more bubbles in the reinforcement layer and the light absorptive layer.

4. The article of claim 3 wherein a light reflective layer is interposed between the substrate and the spacer layer.

5. The article of claim 1, 2, 3 or 4 wherein the thickness of the reinforcement layer is between about 10 and about 40 nanometers.

6. The article of claim 5 wherein the reinforcement layer is composed of a material selected from the group consisting of silicon dioxide, titanium dioxide and aluminum oxide.

7. The article of claim 1 or 3 wherein the spacer layer has a thickness greater than about 10 nonometers.

8. The article of claim 7 wherein the light absorptive layer has a thickness between about 10 and about 50 nanometers.

9. The article of claim 2 or 4 wherein the spacer layer has a thickness between about 10 and about 500 nanometers.

10. The article of claim 9 wherein the light absorptive layer has a thickness between about 3 and about 30 nanometers.

11. The article of claim 1 or 3 wherein the spacer layer is composed of a material selected from the group consisting of magnesium fluoride, lead fluoride, polymerized hydrocarbons, flurocarbons and chlorocarbons, thermoplastics and monomers such as sucrose benzoate and sucrose octoacetate.

12. The article of claim 1 or 3 wherein the light absorptive layer is composed of a material selected from the group consisting of titanium, platinum, rhodium, gold, nickel, chromium, manganese, vanadium and germanium.

13. The article of claim 1 or 3 wherein the light absorptive layer is composed of titanium.

* * * * *